United States Patent [19]

Getz

[11] Patent Number: 4,692,202
[45] Date of Patent: Sep. 8, 1987

[54] MEANS FOR APPLYING LIQUID TO ROLLER IN LINE APPLICATOR

[75] Inventor: John L. Getz, Blachly, Oreg.

[73] Assignee: Industrial Adhesives, Inc., Eugene, Oreg.

[21] Appl. No.: 434,722

[22] Filed: Oct. 18, 1982

[51] Int. Cl.[4] .......................... B31F 5/04; B32B 31/04
[52] U.S. Cl. .................................. 156/554; 156/575; 156/578; 156/579; 118/207; 118/413
[58] Field of Search ............. 156/538, 544, 575, 554, 156/555, 578, 579; 118/203, 204, 207, 407, 413, 414; 427/211

[56] References Cited

U.S. PATENT DOCUMENTS

| | | | |
|---|---|---|---|
| 2,911,942 | 11/1959 | Gross | 118/212 |
| 2,918,899 | 12/1959 | Munton et al. | 118/413 |
| 3,830,197 | 8/1974 | Romaine | 118/204 |
| 4,087,309 | 5/1978 | Lang | 156/579 |
| 4,167,916 | 9/1979 | Pierce | 118/212 |
| 4,285,758 | 8/1981 | Clausen et al. | 156/578 |
| 4,313,780 | 2/1982 | Ford, Jr. | 156/579 |

Primary Examiner—Donald E. Czaja
Assistant Examiner—Merrell C. Cashion, Jr.
Attorney, Agent, or Firm—Kolisch, Hartwell & Dickinson

[57] ABSTRACT

Apparatus for applying liquid to the contacting surface of a roller used in pressing an elongate line to a moving workpiece. The apparatus includes a shoe, mounted on a frame, with a curved face contoured to conform to the curvature of the contacting surface of the roller and a well for holding liquid indented inwardly in and surrounded by the curved face of the shoe. The shoe face terminates in a sharpened edge for scraping debris from the surface of the roller. A spring yieldably biases the shoe toward the contacting surface of the roller. With the shoe so biased, a liquid seal is produced between the curved face of the shoe and the contacting surface of the roller. By filling the recess with a liquid permeable material, uncontrolled dripping of water onto the roller and workpiece is prevented when removing the shoe from its operational position.

10 Claims, 4 Drawing Figures

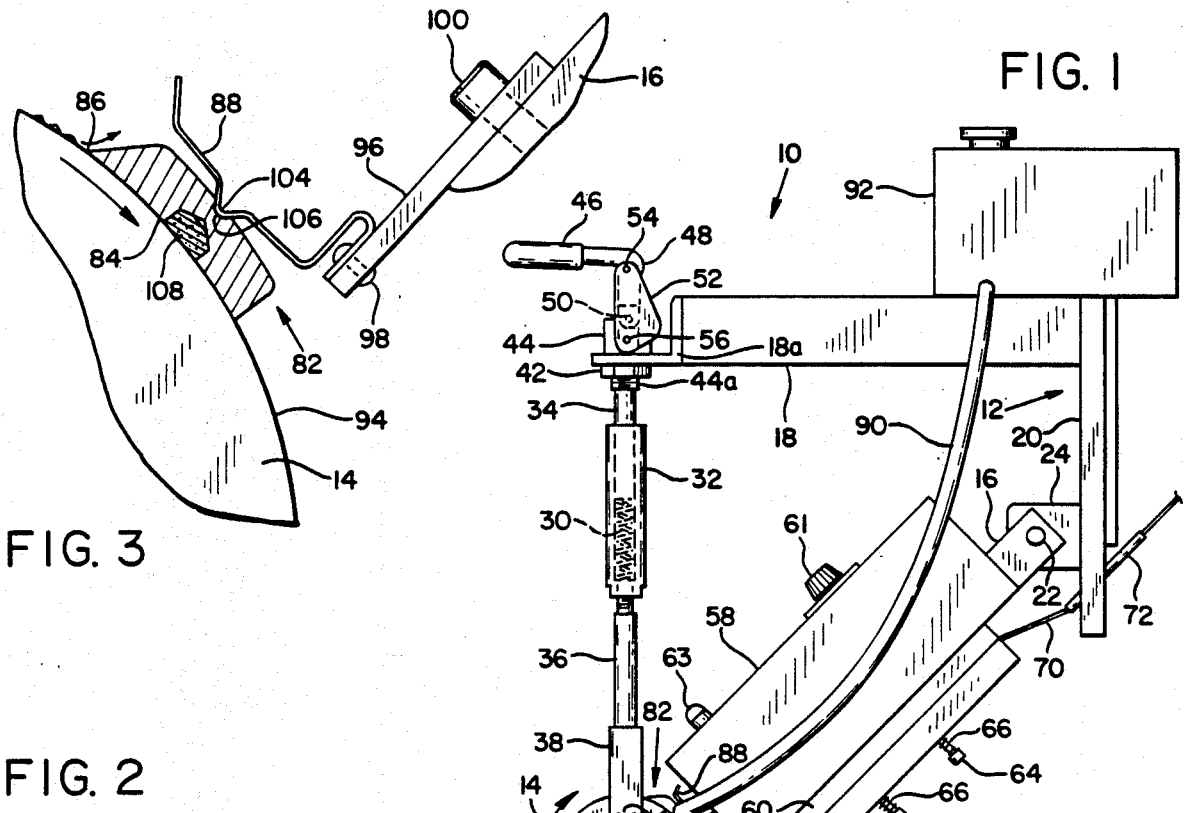
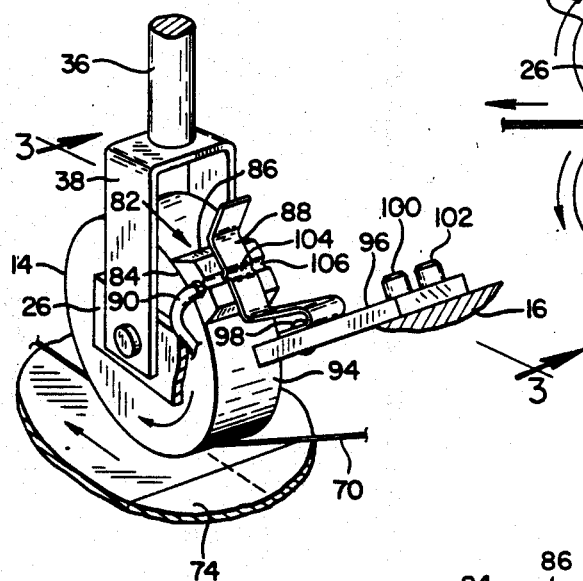
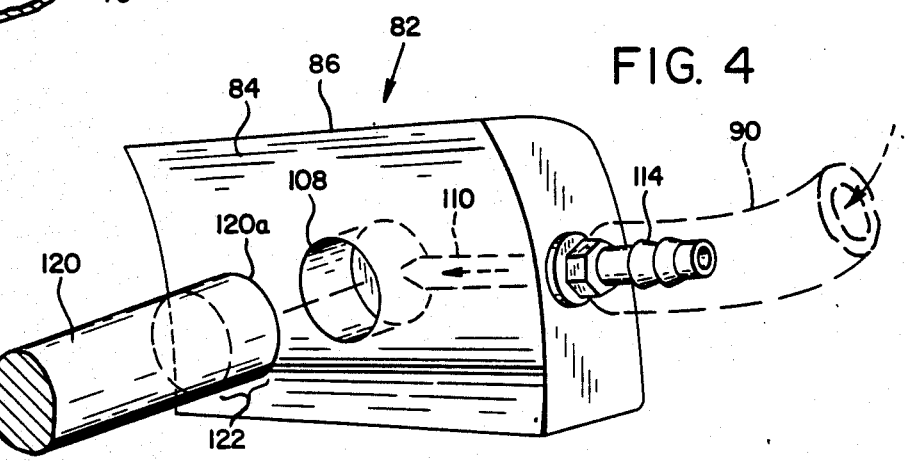

MEANS FOR APPLYING LIQUID TO ROLLER IN LINE APPLICATOR

BACKGROUND AND SUMMARY OF THE INVENTION

This invention relates to an apparatus for applying liquid to a roller, and more particularly, to an apparatus for applying liquid to the contacting surface of a roller used in pressing an elongate string to a moving workpiece.

In the plywood industry, successive veneer pieces such as those that are used in making core pieces in the plywood, are commonly held together with a string which is impregnated with a hot-melt adhesive. The impregnated string is heated and then pressed against the face of a veneer piece by a roller mounted on a frame.

In the above-described operation, a thin film of liquid, which is usually water, must be applied to the roller surface in order to effect release of the string from the roller. Typically, an elongate sponge or felt strip extending across the contacting surface of the roller is used to apply the water. Unfortunately, however, so applied the water tends to drip from the pad onto the veneer as the roller presses against the string, causing excess water to be deposited on the veneer. Problems are subsequently incurred when the veneer piece with such excess water is incorporated into plywood, such as "blow-outs" occurring.

A further problem associated with this process is caused by the accumulation of lint, dirt and wood fiber debris on the sponge or felt strip, which often results in the formation of a debris barrier preventing water transfer. When this occurs, the strip must either be cleaned with a pressurized air stream or replaced, thus necessitating work stoppage.

A general object of this invention is to provide an apparatus for applying a thin film of liquid to the contacting surface of a roller used in pressing a string to a workpiece in a manner which inhibits unrestricted flow of liquid onto the roller and the workpiece.

Another object is to provide an apparatus for scraping lint, dirt and wood fiber debris from the contacting surface of the roller.

A further object is to provide such an apparatus which may be quickly removed or replaced for performance of routine maintenance operations with a minimal interruption of production.

A preferred embodiment of the proposed invention includes a plate or shoe, usually made of brass, which has a curved face that conforms to the curvature of the contacting surface of a roller and a liquid-holding well indented inwardly in and surrounded by the curved face. The shoe face terminates in a sharpened edge which is used for scraping debris from the surface of the roller. A tube connected to a water reservoir supplies the well in the shoe with water. Further, the well is closed off by a water permeable pad, such as felt, which acts to inhibit unrestricted flow of water from the well onto the roller. A spring with a manually releasable detent, which seats on a groove in the shoe, urges the curved face of the shoe toward the contacting surface of the roller thereby effecting sealed contact therewith.

With the construction described, it can be seen that this apparatus applies a thin film of liquid to the roller surface in a manner which inhibits unrestricted flow of liquid onto the roller. Further, problems caused by debris buildup, which could eventually halt production, are reduced or eliminated due to removal of debris by the sharpened edge of the shoe. It is also apparent that the shoe may be easily and quickly removed by manual release of the spring detent.

Although this description has referred specifically to the plywood industry, it will be appreciated that it can be used in other applications as well, such as in the fabric industry where adhesive is used to join fabrics.

These and other objects and advantages are obtained by the invention, which will become more fully apparent from a reading of the following description, which is to be taken in conjunction with the accompanying drawings, wherein:

FIG. 1 is a side elevation of a string applicator which employs an apparatus constructed in accordance with a preferred embodiment of the invention;

FIG. 2 is an enlarged perspective view of a roller and associated structure in the apparatus;

FIG. 3 is an enlarged fragmentary cross-sectional view, taken generally along line 3—3 in FIG. 2, showing the curved face of a shoe biased against the contacting surface of a roller; and FIG. 4 is an enlarged perspective view illustrating further details of the shoe.

DETAILED DESCRIPTION OF A PREFERRED EMBODIMENT OF THE INVENTION

Referring now to the drawings and, more particularly to FIG. 1, there is shown generally at 10 a line or string applicator having a frame including a stationary frame portion, shown generally at 12, and a pivoted arm 16. A roller 14 is rotatably mounted on pivoted arm 16.

Stationary frame portion 12 includes a horizontal extension 18 joined to a vertical post 20 which is suitably stationarily mounted.

Pivoted arm 16 is pivotally connected by pivot 22 to a lug 24 secured to post 20. The lower end of pivoted arm 16 is bifurcated into two horizontal leg expanses, namely expanse 26 and another which is obscured in the drawings. They straddle the ends of roller 14 mounted therebetween. The roller is rotatably mounted on pin 40 which has ends mounted on extremities of the leg expanses.

Roller 14 is biased downwardly by an elongate compression spring, or roller biasing means, 30. To be more specific, indicated at 38 is a clevis with legs that straddle the roller and are mounted adjacent the bottom ends on pin 40. Secured to the top of the clevis is a rod 36, and the upper end of this rod in turn is secured to the lower end of a hollow spring casing 32.

Seated within the interior of the spring casing is an elongate compression spring which has its bottom end bearing against the base of the spring casing 32. Rod 34 has its lower end loosely received in the upper part of the spring casing with such bearing against the upper end of the spring 30.

Bracket 18a is secured to the end of horizontal extension 18. A block 44, having a threaded extension 44a joined to the base thereof, is mounted with this threaded extension passing through an accommodating bore (not shown) provided in bracket 18a. Securing the block in place is a nut 42 screwed onto the threaded extension.

The upper portion of rod 34 extends upwardly and relatively slidably through an accommodating passage extending through block 44 and its extension 44a.

Shown at 46 is an operating handle of approximately L-shape. Offset 48 (partially shown in phantom outline in FIG. 1) of the handle is pivotally connected at 50 to an end of rod 34, which protrudes above block 44. A link 52 is pivotally anchored at its lower end by a pivot 56 to block 44. Pivotally connecting the link to an intermediate portion of the handle is pivot 54.

It should be apparent from the above that with the handle pictured as illustrated in FIG. 1, rod 34 is held in a relatively lowered position, and in this position spring 30, acting against the base of the rod, yieldably urges spring casing from rod 36, and roller 14 downwardly. To release the spring bias, handle 46 may be swung in a clockwise direction in FIG. 1, which has the effect of elevating rod 34.

A housing 58 encases a conventional electrical heater element which is hidden from view by the housing. Two metallic, heat-conductive plates, namely an upper plate 60 and a lower plate 62, are mounted on the underside of pivoted arm 16 and are heated by the heater element. The temperature of the heater element is selectively controlled by dial 61, and shown at 63 is a temperature indicator light. Lower plate 62 is yieldably biased upwardly against the underside of upper plate 60 by means of the cooperating action of screws, exemplified by screw 64, and coil springs, exemplified by coil spring 66, which seat about the screws and have ends bearing on the underside of plate 62. A string-receiving passage (not shown) extends between plates 60 and 62. When operating, string travelling through this passage between plates 60, 62 is heated to an elevated temperature.

An elongate line or string 70, impregnated with hot-melt adhesive, extends through a guide 72 and the string receiving passage extending between plates 60 and 62.

Referring to FIG. 4, a shoe is provided with a liquid-holding well or recess 108 indented or extending inwardly from curved face 84 of the shoe. In the particular construction illustrated, recess 108 has a generally cylindrical shape. Connecting with an inner portion of this recess is an elongate passage 110, which extends from the recess outwardly toward one side of the shoe.

During operation of the apparatus, a release liquid, such as water, is introduced into the recess through passage 110. Such release liquid is supplied to the passage through a flexible conduit 90 which has one end fitted over a nipple 114, mounted on the shoe, with the interior of the nipple connecting with passage 110. As shown in FIG. 1, the opposite end of this conduit 90 connects with a tank or reservoir 92 mounted on the frame of the apparatus which holds a volume of water.

Closing off the recess to prevent uncontrolled flow of release liquid or water therefrom, is a liquid permeable pad 122 which may be made of felt or other liquid permeable material. Such snuggly fills the recess while accommodating controlled seepage of liquid from the interior of the recess outwardly to the face of the pad. The wetted outer face of the pad contacts the roller surface to produce a thin moist film on the roller surface on such being rotated past the pad.

By making the recess of cylindrical shape, the pad may be prepared from an elongate roll of felt, such as the felt roll indicated at 120 in FIG. 4. In making the pad, the end 120a of the felt roll may be manually inserted into recess 108, so as to fill the recess. A razor or other sharp-cutting instrumentality may then be moved downwardly over the curved face of the shoe, cutting such roll smoothly, whereby a plug 122 is formed with an outer face flush with and matching the contour of the shoe face.

It should be noted that the recess for such opens to the face of the shoe and is encompassed or surrounded by the curved shoe face. This is important as such produces a seal entirely about the region where the moisture film is applied through the recess to the contacting surface of the roller.

In order to accommodate release of the string from the roller, it is necessary to apply a thin film of liquid, such as water, to the roller surface. This is easily accomplished by the apparatus described herein. In operation, the curved face of shoe 82 is yieldably biased by spring 88 toward contacting surface 94 of roller 14, so as to establish snug contact between the contacting surface of the roller and the curved face of the shoe.

A liquid, such as water, travels from reservoir 92 through conduit 90 and passage 110 into recess 108. With the shoe snugly fitted against the roller, a very thin film of liquid is applied to the roller surface. When recess 108 is filled with a liquid permeable member such as felt plug 122, dripping is prevented in the event that debris moves under the shoe breaking the seal which normally exists between the curved face of the shoe and the contacting surface of the roller. Furthermore, upon removal of the shoe, as may be required for servicing, the presence of the plug 122, which closes off recess 108, prevents uncontrolled dripping of liquid which would damage a workpiece, such as a veneer face.

Another important function is performed by the sharpened edge of the shoe. As best illustrated in FIG. 3, when the roller advances into sharpened edge 86 of the shoe, debris is scraped from the contacting surface of the roller. This scraping function is significant because it helps to prevent debris from moving under the curved face of the shoe, which could break the water seal formed between the shoe and the roller.

In positioning the shoe against the roller, it is an easy matter to manually lift the unsecured end of spring 88 and place groove 106 of the shoe under spring detent 104. Conversely, the shoe may be easily and quickly removed from its operational position for servicing.

While a particular embodiment of the invention has been described, it should be obvious that variations and modifications are possible without departing from the spirit of the invention.

It is claimed and desired to secure by Letters Patent:

1. In a line applicator having a frame and a rotatable roller with a peripheral contacting surface for pressing an elongate line to a moving workpiece, means for applying liquid to the contacting surface of the roller comprising:
   a shoe mounted on the frame having a curved face which is contoured to the curvature of the contacting surface of the roller and establishing sealed contact with the contacting surface, said surface of the roller moving under said face with rotation of the roller,
   a liquid-holding well formed in said shoe communicating through an opening with said curved face of said shoe, with said opening completely encompassed by said curved face and the sealed contact established by the curved face, and
   liquid-supply means connected to said well for supplying liquid thereto.

2. The line applicator of claim 1, which further includes biasing means interposed between the frame and said shoe urging the curved face of said shoe toward the contacting surface of said roller thereby producing said sealed contact therewith.

3. The line applicator of claim 1, which further includes a liquid permeable member closing off said opening which joins said well and the curved face of said shoe and inhibiting unrestricted flow of liquid from said well onto the surface of the roller.

4. The line applicator of claim 1, wherein the curved face of said shoe terminates in a sharpened edge which the surface of the roller advances into prior to moving under the curved face.

5. The applicator of claim 1, wherein the liquid-supply means comprises a passage formed in said shoe which connects with said well and communicates with the exterior of said shoe, a reservoir, and conduit means connecting said reservoir and passage.

6. In apparatus for applying a line to a workpiece:
a frame,
a roller rotatably mounted on said frame having a peripheral contacting surface for pressing the line to the workpiece,
a shoe having a curved face contoured to conform to the surface of said roller positioned with said face against said roller,
biasing means interposed between said frame and said shoe urging the curved face of said shoe toward the contacting surface of said roller and producing a sealed contact therewith,
a recess indented inwardly from the curved face of said shoe and surrounded by the curved face of said shoe,
means operatively connected to said recess for supplying liquid thereto, and
a liquid permeable member closing off said recess where such joins with the curved face of said shoe inhibiting unrestricted flow of liquid from said recess onto the surface of said roller,
said shoe face terminating in a sharpened edge which the surface of said roller advances into prior to moving under said shoe face.

7. The apparatus of claim 6, wherein said biasing means comprises a spring with a manually releasable detent which seats on said shoe and accommodates detachment of said shoe from said biasing means.

8. The apparatus of claim 6, wherein said recess is generally cylindrical, and said permeable member is a cylindrical plug seated in said recess.

9. The apparatus of claim 6, wherein the liquid-supply means comprises a passage in said shoe connecting with said recess, said passage communicating with the exterior of said shoe, a remotely located reservoir, and conduit means connecting said reservoir and said passage.

10. In an apparatus for applying a line to a workpiece:
a frame including a stationary portion and a pivoted arm pivoted on said stationary portion,
a roller rotatably mounted on the pivoted arm having a peripheral contacting surface for pressing an elongate line to a workpiece,
a shoe having a curved face contoured to conform to the surface of said roller disposed with the curved face against said roller,
biasing means interposed between the pivoted arm and said shoe to yieldably bias said shoe into the surface of said roller producing a sealed contact therewith, said biasing means comprising a spring with a manually releasable detent which seats on said shoe and accommodates detachment of said shoe from said biasing means,
a generally cylindrical recess indented inwardly from the curved face of said shoe and surrounded by the curved face of said shoe,
a passage formed in said shoe connecting with the recess and communicating with the exterior of said shoe,
a liquid-holding reservoir mounted on said stationary portion of said frame,
flexible conduit means connected at one end to the passage and at its other end to said reservoir providing a supply of liquid to said recess,
a liquid permeable member closing off said recess where such joins with the curved face of said shoe inhibiting unrestricted flow of liquid from said recess into the surface of said roller,
said shoe face terminating in a sharpened edge which the surface of said roller advances into prior to moving over said shoe face, and
roller-biasing means comprising a spring interposed between said pivoted arm and the stationary portion of said frame which yieldably and downwardly biases the roller toward a workpiece.

* * * * *